United States Patent [19]

Knowles et al.

[11] 4,082,940

[45] Apr. 4, 1978

[54] SOLDERING IRON WITH REPLACEABLE HEATING ELEMENT AND A GROUNDED HANDLE AND COMPONENTS THEREOF

[75] Inventors: Alvis R. Knowles, Carson; Harold S. Foster, Huntington Beach, both of Calif.

[73] Assignee: Eldon Industries, Inc., Hawthorne, Calif.

[21] Appl. No.: 666,062

[22] Filed: Mar. 11, 1976

[51] Int. Cl.² .................. B23K 3/02; H01R 3/02; H05B 1/00

[52] U.S. Cl. .................. 219/239; 219/227; 219/237; 219/533; 219/541; 339/14 R; 339/58

[58] Field of Search .............. 219/227, 229, 236, 237, 219/238, 239, 240, 533, 541, 228; 339/95 R, 58, 14 L, 14 R, 14 P, 14 RP, 14 T, 177 R, 177, 177 L, 255 R, 147, 178

[56] References Cited

U.S. PATENT DOCUMENTS

| 8,282 | 6/1978 | Eaton | 219/227 |
|---|---|---|---|
| 1,291,443 | 1/1919 | Dorsey | 339/14 RP |
| 1,820,799 | 8/1931 | Hazlett | 219/237 |
| 2,515,781 | 7/1950 | Lennox | 219/237 |
| 2,757,351 | 7/1956 | Klostermann | 339/255 R |
| 3,121,781 | 2/1964 | Schoenwald | 219/237 |
| 3,897,125 | 7/1975 | Anderson | 339/14 L |

FOREIGN PATENT DOCUMENTS

| 594,099 | 5/1959 | Italy | 219/238 |
|---|---|---|---|
| 558,366 | 1/1944 | United Kingdom | 219/229 |

Primary Examiner—J. V. Truhe
Assistant Examiner—Bernard Roskoski
Attorney, Agent, or Firm—Edward D. O'Brian

[57] ABSTRACT

A soldering iron can be constructed using a heating element structure or first part connected to a handle structure or second part through the use of connectors on these parts which are adapted to be secured together through the use of a rotary or twisting type motion. The handle structure includes a spring biased sleeve which projects from it toward the heating element structure. The heating element structure includes a metal flange which is resiliently engaged by the sleeve when the parts are connected together. This flange in effect forms a part of a tubular, metal housing used to connect a body disposed in proximity to the heating element so as to conduct heat away from the heating element and the connector on the heating element structure. The housing serves to protect the heating element structure against physical damage and is grounded through the flange and the sleeve to an appropriate grounding wire leading from the handle structure.

14 Claims, 6 Drawing Figures

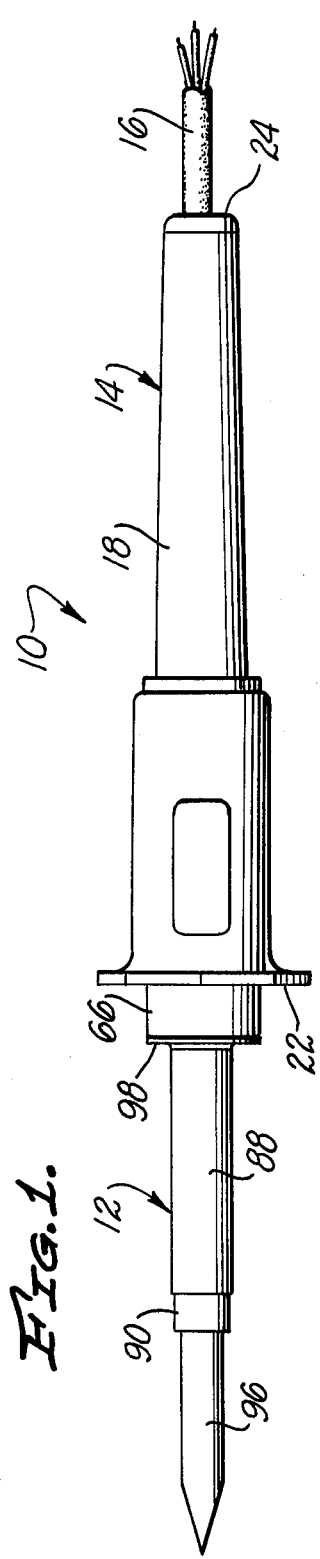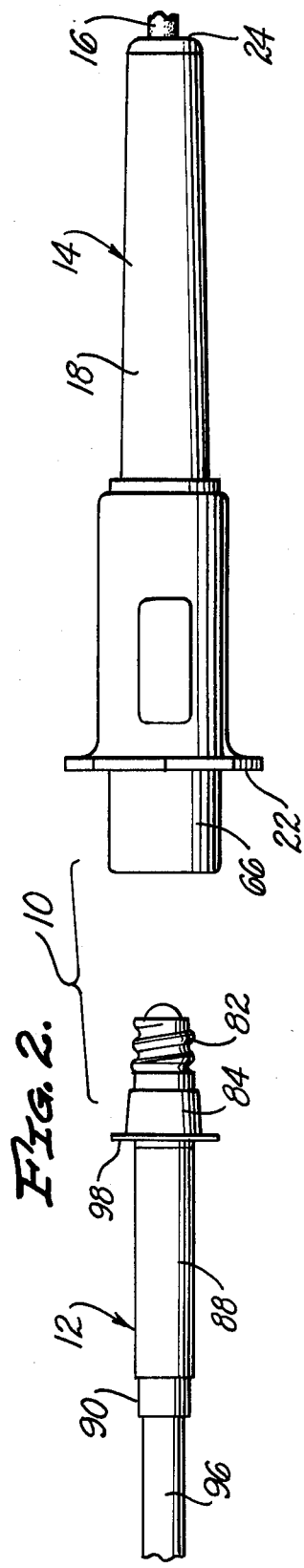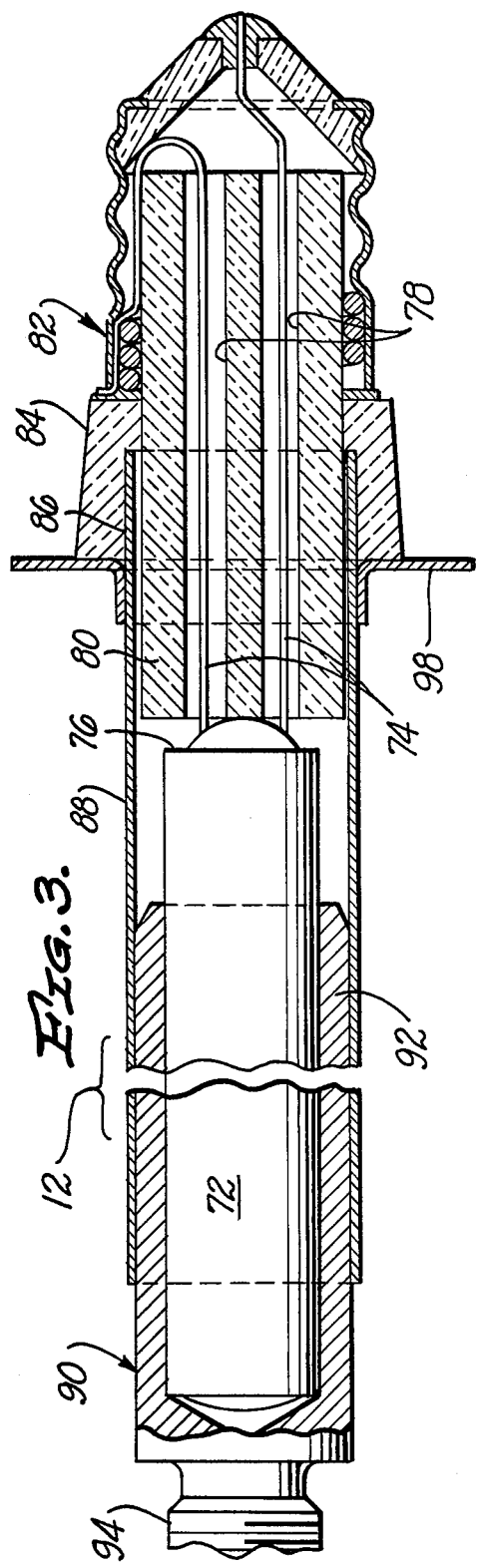

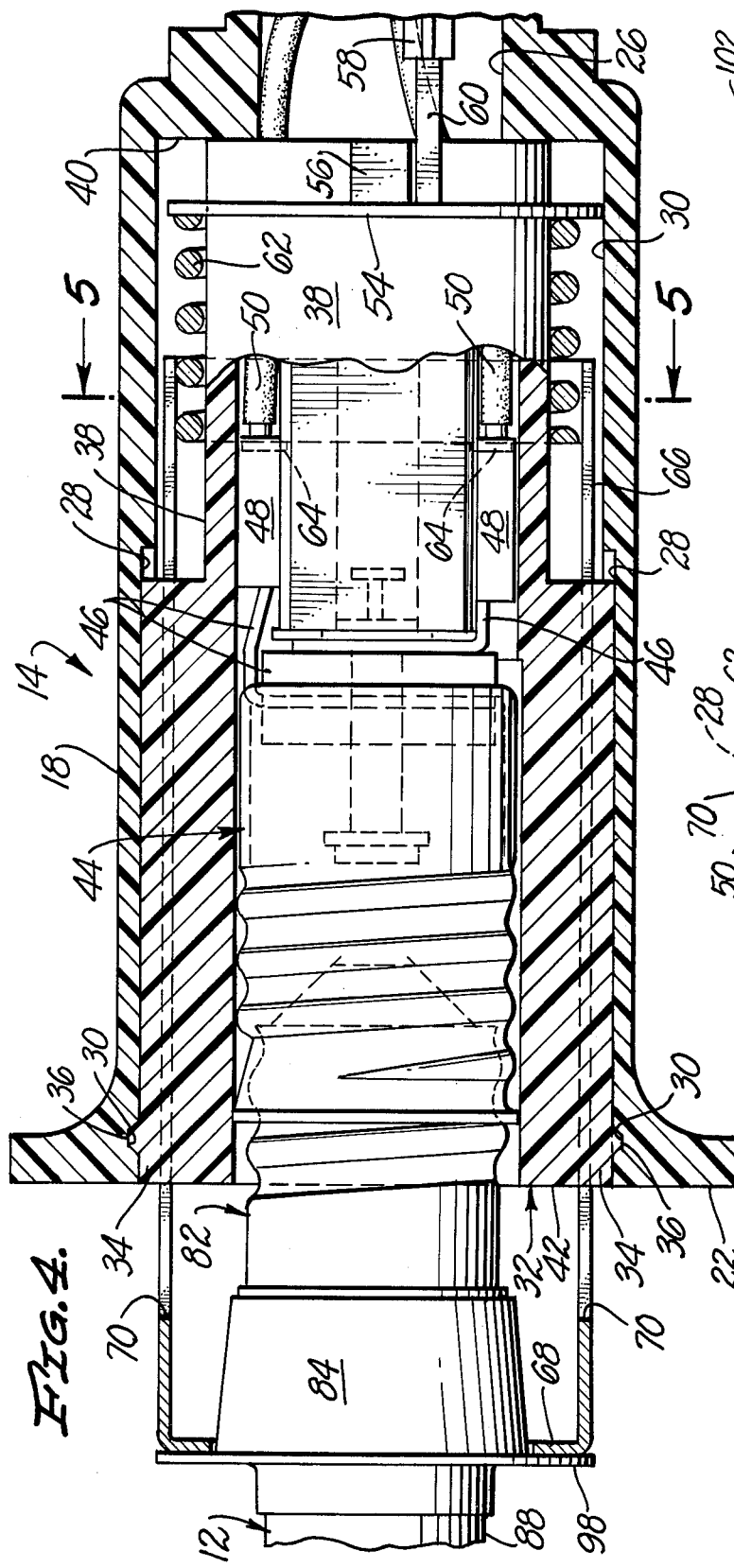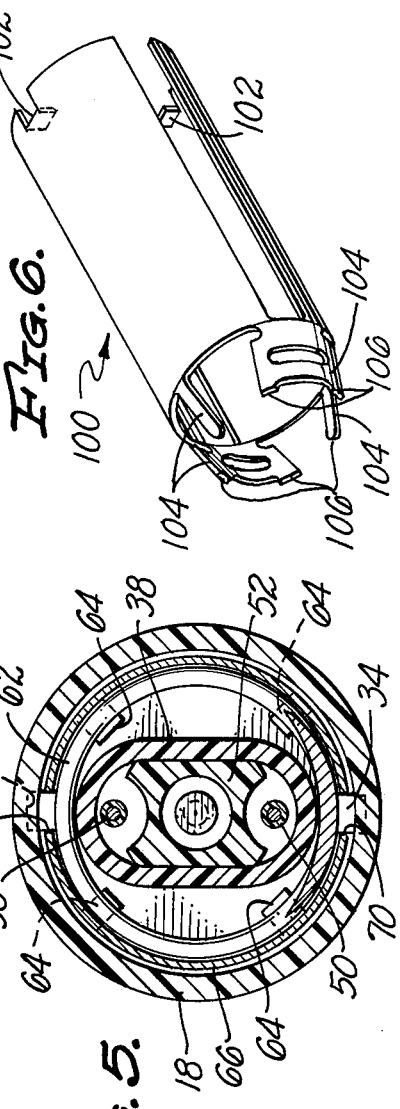

SOLDERING IRON WITH REPLACEABLE HEATING ELEMENT AND A GROUNDED HANDLE AND COMPONENTS THEREOF

BACKGROUND OF THE INVENTION

The invention set forth in this specification relates to new and improved soldering irons, each of which includes a replaceable heating element structure and a grounded handle structure, and relates to the components for such soldering irons. Although the invention set forth in this specification is primarily related to such soldering irons it is to be understood that the invention can also be utilized in the construction of various related tools or implements such as, for example, vaious types of cauterizing, sculpting, wood burning, and various other devices.

Many different types of soldering irons have been known and utilized in applying solder in order to join two different items or pieces of metal together. It has been conventional to construct different types of soldering irons for different specialized purposes in various different manners. One common type of iron which is commonly utilized in the electronic industry, but which is also used in other fields, consists of an elongated electrically non-conductive handle which is utilized with an electric cord supplying electric power to a socket located within an end of the handle. Soldering irons of this type include an electric heating element structure including a resistance heating element mounted upon a base adapted to be secured to such a socket and a body of a metal capable of conducting heat from the heating element to a tip used in applying such heat as, for example, in connection with a soldering operation. Structures of this type are considered to be especially desirable inasmuch as different heating element structures capable of producing different amounts of heat and/or having other different characteristics are capable of being utilized with the same handle as may be reasonably required.

Although such soldering iron structures as are indicated in the preceding are considered to be quite advantageous and safe to use from an electrical standpoint concern over conceivably possible, although theoretically very remote, electrical hazards has made it desirable to modify soldering irons of the type indicated in such a manner as to ground the heating element structure. The purpose here is to protect a user from the remote chance of the heating element in such a structure becoming damaged so as to short out to the body of heat conductive material used. It is considered that none of the known or conventional manners of grounding electrical appliances or tools are particularly desirable for use in connection with soldering irons as indicated because of the manner in which heating element structures are replaceably mounted in such soldering irons.

SUMMARY OF THE INVENTION

From this it is believed that it will be apparent from the preceding that there is a need for new and improved soldering iron structures of the general type indicated in the preceding discussion in which provision is made for grounding the heating element so as to protect it against electrical hazards. An object of the present invention is to fulfill this need. A related objective of the invention is to provide a new and improved method of grounding a first part of an electrical tool, appliance and/or implement such as the heating element structure in a soldering iron which is replaceably mounted upon a second part of such a tool or implement such as the handle of a soldering iron.

The invention is also intended to provide new and improved parts of such electrical tools, appliances and/or implements which can be separately manufactured and sold and which are adapted to be utilized in conjunction with one another so as to form a complete, useable utensil or device. A still further objective of the invention is to provide items as indicated in this discussion which may be easily and conveniently manufactured at a comparatively nominal cost, which may be easily and conveniently assembled in an operative manner, and which are capable of giving prolonged, reliable, effective performance, which are relatively immune to physical damage and which provide adequate protection against shorting by grounding the operative parts employed.

In accordance with this invention these objectives are achieved by providing in the combination of first and second parts, cooperating connection means located on said parts for establishing electrical connection through said parts by twisting these parts relative to one another about an axis and for detachably mounting said parts together, and cooperating grounding means located on the parts for establishing a ground connection between the parts, the improvement which comprises: the grounding means on the first part comprising a metal flange extending outwardly from and around the first part, the grounding means of the second part including an electrically conductive member mounted on the second part so as to be capable of being moved so as to extend from the second part and spring means on the second part resiliently biasing the member outwardly away from the second part.

As a structure of this type is utilized with the two parts held together through the connection means the noted member serves to ground out the flange on the first part through an appropriate grounding conductor connected to the second part. Further, the flange is located on the first part so that in the event there is need for grounding that a satisfactory ground connection will be established through the flange and the member. With this type of construction when the parts are twisted together the member will engage and be moved relative to the flange so as to tend to remove any accumulations between the member and the flange which might give rise to an electrical resistance between these parts precluding adequate grounding.

BRIEF DESCRIPTION OF THE DRAWING

A summary such as the preceding is considered to be desirable in providing a generalized understanding of an invention such as the invention set forth in this specification. If such a summary is to briefly indicate the nature or character of an invention such as the described invention it cannot indicate all facets and features of the invention. Such further details of the present invention are best indicated with reference to the accompanying drawing in which:

FIG. 1 is a side elevational view of a soldering iron constructed in accordance with the present invention;

FIG. 2 is a side elevational, exploded view showing the heating element structure employed in this soldering iron disassembled from the handle structure employed in this iron;

FIG. 3 is a cross-sectional view at an enlarged scale in which a few parts are shown in elevation illustrating the internal construction of the heating element structure shown in the preceding figures;

FIG. 4 is a cross-sectional view at an enlarged scale in which a few parts are shown in elevation illustrating the internal construction of the handle structure shown in FIGS. 1 and 2 as the heating element structure is being installed in place, a portion of this heating element structure being illustrated in this view in elevation;

FIG. 5 is a cross-sectional view taken at line 5—5 of FIG. 4; and

FIG. 6 is an isometric view of a modified sleeve preferably utilized in place of a sleeve as illustrated in FIGS. 1, 2 and 4 of the drawing in a presently preferred embodiment or form of a soldering iron structure of the present invention.

It is believed that it will be apparent to those skilled in the design and construction of soldering irons and various related implements and/or devices from a detailed consideration of the identified drawings and of the remainder of this specification that the principles and features of this invention set forth and defined in the appended claims may be utilized in quite a variety of differently appearing and somewhat differently constructed implements or devices. For this reason the invention described in this specification is to be considered as being limited solely by the appended claims forming a part of this specification.

DETAILED DESCRIPTION

In the drawing there is shown a complete soldering iron 10 constructed in accordance with this invention so as to utilize a heating element structure or first part 12 and a handle structure or second part 14. This handle structure 14 is adapted to be utilized with a conventional three-wire electric cord or cord set 16 used in a conventional manner in connection with connecting the iron 10 into a circuit and in connection with providing a suitable ground connection for this iron 10.

The handle structure 14 includes a generally elongated hollow handle 18 formed of a relatively heat resistant electrically non-conductive material. This handle 18 includes a generally cylindrical cavity or chamber 20 leading from a flat end 22 of this handle 18. This cavity 20 is in communication with the other end 24 of the handle 18 by means of a comparatively small passage 26 which is of such dimension that the cord 16 fits closely within this passage 26. The handle 18 is constructed so as to include two parallel grooves 28 leading from the end 22 parallel to the axis of the cavity 20 part way along the length of this cavity 20. Preferably a small depression 30 is formed within each of the grooves 28.

A generally cylindrical socket insert 32 formed of an electrically non-conductive material is located so as to extend into the cavity 20 from the end 22. This insert 32 is dimensioned so as to be spaced from the interior of the cavity 20 by elongated ribs 34 which fit within the grooves 28. These ribs also prevent rotation of the insert 32. Preferably small bumps 36 are formed upon the ribs 34 in locations enabling the bumps 36 to fit within the depressions 30. In the preferred manner of construction the handle 18 and the insert 32 are formed of a material or of materials which are sufficiently flexible or resilient to permit these bumps 36 to be snapped into place. Obviously other means can be used to secure the insert 32 in an operative position as shown.

This insert 32 also includes a hollow, tubular extension 38 of a more or less oval cross-sectional configuration as indicated in FIG. 5 of the drawing. This extension 38 is dimensioned so as to fit against a back wall 40 of the cavity 20 when the insert 32 is in an operative position so that the end 42 of the insert 32 will be held in the same plane as the plane of the end 22. This extension 38 is of lesser cross-sectional dimension than the interior of the cavity 20 in order to provide adequate room for various operative parts as hereinafter described.

The insert 32 carries a conventional internally threaded electric socket 44 of a conventional construction. This socket 44 includes conventional mounting means 46 which are utilized to support the socket 44 within the insert 32 so that it generally faces the end 22. These means 46 also include what may be regarded as terminals 48 connecting the socket 44 to two wires 50 of the cord 16. These wires 50 are located so as to extend from the cord 16 through the extension 38. If desired, a conventional retainer (not shown) can be employed so as to prevent the wires 50 from being pulled from the structure 14. They are electrically isolated from one another within the extension 38 by means of an electrically non-conductive separator 52 as shown in FIG. 5.

A somewhat washer-like, generally U-shaped metal spring retainer 54 is preferably force fitted around the exterior of the extension 38 so as to extend generally perpendicular to the axis of the cavity 20. This retainer 54 may be secured in place in any convenient manner such as, for example, through the use of an appropriate adhesive (not shown) or of resilient tabs 56. This retainer 54 is secured to a wire 58 in the cord 16 through the use of another conventional terminal 60. This retainer is engaged by a metal coil spring 62 located in the cavity 20 around the extension 38 in such a manner that the spring 62 is in constant electrical communication or contact with the retainer 54. This spring 62 is normally held under compression by the end of it (not separately numbered) remote from the retainer 54 being engaged by a series of small, metal tabs 64 on a generally cylindrical metal grounding sleeve 66.

This grounding sleeve 66 is slidably mounted on the handle 18 so as to fit generally between the socket insert 32 and the interior of the cavity 20. It will be noted that this sleeve 66 is thus concentrically located about the axis of this cavity 20 and about the socket 44 in such a manner that it may be moved in a linear path. This sleeve 66 extends outwardly from the end 22 and terminates in an inwardly directed terminal flange 68. This sleeve 66 includes elongated slots 70 which fit around the ribs 34 in such a manner as to prevent the sleeve 66 from rotating relative to the handle 18 as the heating element structure 12 is assembled upon the housing structure 14.

This heating element structure 12 includes an elongated resistance heating element 72 having a cylindrical exterior configuration. This heating element 72 is preferably constructed in a known manner so as to have electrical conductors 74 extending parallel to one another from one of its ends 76. These conductors 74 extend through holes 78 in a conventional, electrically non-conductive cylinder 80 forming a part of a conventional, externally threaded base 82 adapted to be threaded into the socket 44. This base 82 is essentially of conventional construction; because of this all of the parts of it which are of a conventional character are not further described herein.

In the structure of the present invention this base 82 includes a spacing washer 84 of electrically non-conductive material which is especially formed for use with the present invention so as to accommodate and hold an end 86 of a physically strong electrically conductive metal tube 88 so that this tube 88 extends generally from the base 82 and around a portion of the element 72 so as to enclose the area between the base 82 and the element 72. The tube 88 may be secured to the cylinder 80 and the washer 84 in any conventional manner, such as, for example, through the use of a conventional weld (not shown).

The structure 12 also includes a body 90 of a heat and electrically conductive metal having a cylindrical tubular portion 92 fitting closely over and around the element 72 in such a manner that the end 76 of this element 72 is not encased or encompassed by this portion 92. Preferably the portion 92 and the element 72 are secured to one another in such a manner that there can be no relative movement between them in a conventional manner. such relative movement may be achieved through the use of a close, tight fit between these parts or through the use of an appropriate, conventional bonding material. The body 90 also includes an end 94 extending from it which is adapted to be utilized in applying heat. Preferably the end 94 is threaded as shown in FIG. 3 so that an appropriate tip 96 or similar part may be threaded on it.

The tube 88 extends so as to fit closely around and against the tubular portion 92 as indicated in FIG. 3 of the drawing. Preferably this tube 88 is secured to the tubular portion 92 in an appropriate, conventional manner such as, for example, by welding or the like although if desired it can merely be secured in place by means of a press-fit. When the tube 88 is secured in this manner it extends between the base 82 and the body 90 so as to serve as a housing protecting the heating element 72 and the mounting of this heating element 72 on the base 82 against damage such as might occur from dropping or the like.

In effect the tube 88 supports the body 90 in an operative position as shown. This tube 88 is secured in any conventional manner to an annular metal flange 98 in effect serving with the tube 88 as a part of the housing. This flange 98 is concentric with the axis of the tube 88 and the base 82. It extends completely around the tube 88 and is fitted against the washer 84. Because this flange 98 is secured to the tube 88 there can be no relative movement between the flange 98 and the tube 88.

In assembling the iron 10 the heating element structure 12 is moved toward the handle structure 14 with the base 82 in alignment with the socket 44. As this occurs because of the relative dimensions of the parts the flange 98 will abut up against the flange 68 of the sleeve 66. At this point the two structures 12 and 14 are assembled by relative rotation or twisting so as to draw the base 82 into the socket 44. As this occurs pressure will be exerted against the sleeve 66 tending to compress the spring 62. Also as this occurs there will be a sliding or wiping action between the flange 68 and the flange 98 which will tend to break loose any possible surface contamination between these two parts so as to establish a low resistance contact between them in a line or path extending completely around the flange 98.

When the structures 12 and 14 have been completely threaded together what may be regarded as "good" contact will have been established between the flange 98 and the sleeve 66. As a result of such contact in the event of shorting any current resulting from the element 72 being damaged and/or not performing satisfactorily which might give rise to an electrical hazard will travel from the body 90 to the tube 88 and to the flange 98 and then to the sleeve 66 and from this sleeve 66 to the spring 62 and then to the retainer 44 and finally to the wire 58 so as to be disposed of in a conventional manner.

In FIG. 6 of the drawing there is shown a modified sleeve 100 corresponding to the sleeve 66 which is presently considered preferable for use instead of a sleeve 66 in a soldering iron such as the soldering iron 10. This sleeve 100 is also of a cylindrical configuration and is provided with tabs 102 corresponding to the tabs 64. In place of the flange 68 this sleeve 100 utilizes a plurality of inwardly bent spring flanges 104 which terminate in edges 106 which are adapted to scrape along the flange 98 and to flex inwardly as parts as indicated are assembled so as to scrape off any possible present material preventing a high resistance contact between the sleeve 100 and a flange corresponding to the flange 98.

We claim:

1. In the combination of first and second parts, cooperating connection means located on said parts for establishing an electrical connection through said parts by twisting said parts relative to one another about an axis and for detachably mounting said parts together and cooperating grounding means located on said parts for establishing a ground connection between said parts, the improvement which comprises:
   said grounding means on said first part comprising a metal flange located in a plane perpendicular to said axis around said axis so as to extend outwardly from and around said first part adjacent to said connection means on said first part,
   said grounding means on said second part including an electrically conductive member mounted on said second part so as to extend therefrom adjacent to said connection means on said second part and so as to be capable of being moved parallel to said axis relative to said second part and also including spring means on said second part resiliently engaging said member and biasing said member outwardly away from said second part,
   said connection means on said parts are adapted to be twisted together so as to establish an electrical connection and so as to mount said parts together,
   said member serving to establish a ground connection with said flange through physical engagement with said flange when said parts are secured through said connection means, said member engaging said flange as said parts are secured through said connection means and twisted so as to tend to remove any accumulations of material from between said member and said flange.

2. The combination claimed in claim 1 wherein:
   said connection means on said parts are adapted to be screwed together so as to establish an electrical connection and so as to mount said parts together.

3. The combination claimed in claim 1 wherein:
   said member comprises a sleeve located concentrically around said axis, said sleeve having an end located in a plane perpendicular to said axis extending from said second part, said end of said sleeve being capable of establishing continuous contact with said flange in a circular path around said axis when said parts are mounted together.

4. The combination claimed in claim 1 wherein:

said member comprises a sleeve located concentrically around said axis, said sleeve having an end located in a plane perpendicular to said axis and extending from said second part, said end including at least one means for scraping along said flange so as to remove accumulations as said connection means are twisted together.

5. The combination claimed in claim 1 wherein:
said first part comprises a heating element structure and said second part comprises a handle for said heating element structure,
said heating element structure includes an electric heating element including electrical conductors extending from a portion thereof,
base means serving as said connection means,
a metal heat conducting body located around a part of said heating element other than said portion of said heating element, said body having an end leading therefrom,
a metal housing connecting said body and said base means and enclosing the space between said body and said base means,
said housing including said metal flange, said flange being located on said housing adjacent to said base means.

6. The combination claimed in claim 5 wherein:
said handle has an end, said connection means on said handle being located on said end,
said handle includes a cavity having a circular cross-sectional configuration located concentrically about said connection means on said end of said handle and leading into the interior of said handle,
said member comprises a sleeve fitting within said cavity and being slidable from therein in an axial direction, said sleeve having an end extending from said end of said handle,
said spring means is located within said handle in engagement with said sleeve.

7. The combination claimed in claim 6 wherein:
said end of said sleeve is located in a plane perpendicular to said axis, said end of said sleeve being capable of wiping along and establishing continuous contact with said flange when said parts are twisted together.

8. The combination claimed in claim 6 wherein:
said end of said sleeve is located in a plane perpendicular to said axis, said end of said sleeve including at least one edge projecting therefrom capable of scraping along said flange as said connection means are twisted together.

9. A soldering iron which comprises:
an elongated, hollow handle having opposed ends,
an insert located within said handle adjacent to a first of said ends, said insert defining between the interior of said housing and the exterior of said insert a generally cylindrical cavity leading from said first end,
a threaded electric socket located within the interior of said insert adjacent to said first end,
a sleeve shaped so as to correspond in cross-sectional configuration to the configuration of said cavity located within said cavity, said sleeve extending outwardly from said cavity past said first end,
cooperating means for limiting the movement of said sleeve outwardly from said first end,
spring means located within said housing and engaging said sleeve for biasing said sleeve outwardly away from said first end,
electrical conductor means electrically connected to said sleeve and said socket means and extending outwardly from within the interior of said handle through said second of said ends for connecting said socket means into a circuit and for establishing a ground connection to said sleeve,
a threaded electric base mounted on said socket means,
an electric heating element including electrical conductors extending therefrom located adjacent to said threaded base, said conductors being electrically connected to said base,
a metal heat conducting body for conducting heat from said heating element having a tubular portion surrounding a portion of said heating element, the remainder of said body extending away from said heating element,
a tubular metal housing physically and electrically connected to said tubular portion of said body and said base, said tubular housing enclosing the space between said heating element and said base,
an outwardly extending metal flange extending around and forming a part of said housing adjacent to said base, said flange being engaged by the extremity of said sleeve remote from said handle and serving to hold said sleeve so that said spring means is under compression.

10. A soldering iron as claimed in claim 9 wherein:
said extremity of said sleeve engages said flange in a line extending around said flange.

11. A soldering iron as claimed in claim 9 wherein:
said extremity of said sleeve carries at least one projection capable of scraping along and establishing electrical contact with said flange as said base is threaded into said socket.

12. A handle structure for use in holding a heating element structure, said handle structure including a handle having an end, a connection means for use in holding said heating element structure and for connecting said heating element structure into a circuit, said connection means being centrally located on said end of said handle, in which the improvement comprises:
an elongated cavity extending inwardly of said handle from said end of said handle, the interior of said cavity being electrically insulated from said connection means,
said cavity having a circular cross-sectional configuration and being located concentrically about said connection means,
a sleeve slidably mounted in said cavity so as to extend outwardly from said end of said handle, said sleeve being slidably mounted in said cavity, and
spring means within said handle engaging said sleeve so as to bias said sleeve to a position in which it will extend outwardly from said handle, and
limiting means for limiting movement of said sleeve away from said handle,
said handle structure including cooperating means on said sleeve and within said handle for preventing twisting of said sleeve relative to said handle.

13. A handle structure as claimed in claim 12 wherein:
said connection means comprises an internally threaded socket,
said cavity and said sleeve are located concentrically about said socket, said sleeve including an end located in a plane perpendicular to the axis of said sleeve remote from said handle,
said end of said sleeve being capable of wiping along and establishing continuous live contact with a flange on said heating element structure.

14. A handle structure as claimed in claim 12 wherein:
said connection means comprises an internally threaded socket,
said cavity and said sleeve are located concentrically about said socket,
said sleeve including an end located in a plane perpendicular to the axis of said sleeve remote from said handle,
said end of said sleeve including at least one edge projecting therefrom capable of scraping along and establishing electrical contact with a flange on said heating element structure mounted on said handle structure.

* * * * *

UNITED STATES PATENT AND TRADEMARK OFFICE
CERTIFICATE OF CORRECTION

PATENT NO. : 4,082,940
DATED : APRIL 4, 1978
INVENTOR(S) : ALVIS R. KNOWLES and HAROLD S. FOSTER It is certified that error appears in the above–identified patent and that said Letters Patent are hereby corrected as shown below:

Column 7, line 66, "housing" should read --handle--.

Column 8, line 2, cancel the word "means" after "socket".

Column 8, line 5, cancel the word "means" after "socket".

Column 8, line 19, after the word "and" add --physically connected to--.

Column 7, line 55, "housing" should read -- handle --.

Signed and Sealed this

Fifteenth Day of January 1980

[SEAL]

Attest:

SIDNEY A. DIAMOND

Attesting Officer

Commissioner of Patents and Trademarks